Figure 1:
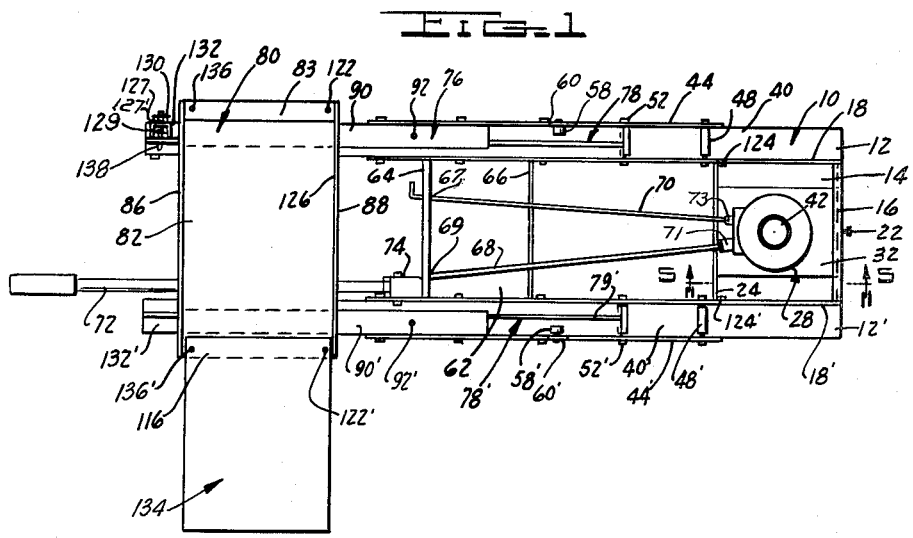

March 7, 1961      J. MALIK      2,973,875

VEHICLE JACK

Filed May 27, 1957      2 Sheets-Sheet 1

INVENTOR
JOHN MALIK

SMITH, OLSEN, LEWIS & McRAE
ATTORNEYS

March 7, 1961          J. MALIK          2,973,875
VEHICLE JACK
Filed May 27, 1957          2 Sheets-Sheet 2
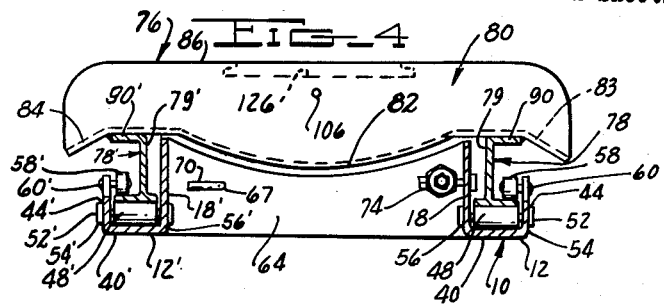
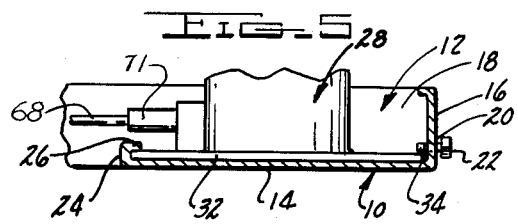
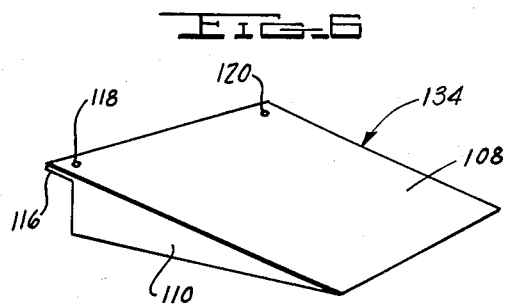
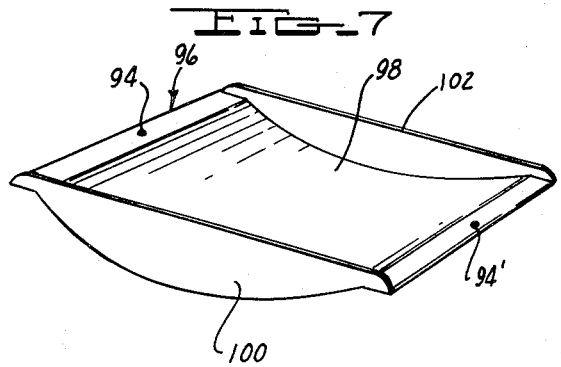
INVENTOR
JOHN MALIK
SMITH, OLSEN, LEWIS & McRAE
ATTORNEYS

United States Patent Office 2,973,875
Patented Mar. 7, 1961

2,973,875
VEHICLE JACK
John Malik, 47595 W. Huron River Drive,
Belleville, Mich.
Filed May 27, 1957, Ser. No. 661,906
7 Claims. (Cl. 214—334)

This invention relates to vehicle jacks, and particularly to a vehicle jack which is suitable to be carried in a truck for use in changing the tires and also suitable for use in a truck repair garage.

There has long been a need for a portable truck jack which would enable a man to easily and safely change a flat tire by himself.

The major problems involved in changing a truck tire are centering the lifting jack beneath the axle, removing the wheel from the hub and replacing the wheel on the hub.

The most difficult of these three is replacing the wheel on the hub. The average truck tire weighs about 125 pounds and has a diameter of about 36 inches. This bulk and weight make the tire hard to handle.

The one changing the tire must assume an awkward position, lift the tire off the ground and center it on the hub, making sure the studs on the hub extend through the openings in the wheel.

The present invention solves this problem by providing a movable carriage support for the wheel. While the idea of a movable carriage is not new, there has not been, until now, a portable jack developed which provided a practicable structure for removing and replacing a truck wheel.

Therefore, it is a principal object of the present invention to provide a portable truck jack which will enable one man to change a flat tire on a truck.

It is another object to provide such a jack whereby the wheel will be carried in a movable carriage, thereby permitting easy removal and replacement of the wheel.

It is a further object to provide a truck jack wherein the lifting element is easily aligned with the axle.

Other objects of this invention will appear in the following description and appended claims, reference being had to the accompanying drawings forming a part of this specification wherein like reference characters designate corresponding parts in the several views.

Figure 2:
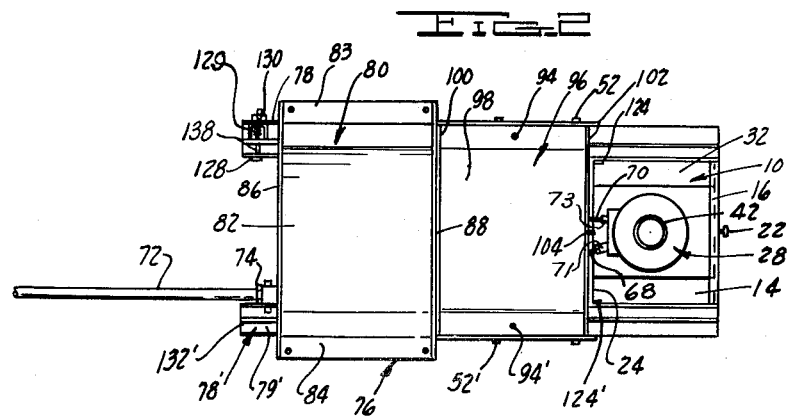
Figure 3:
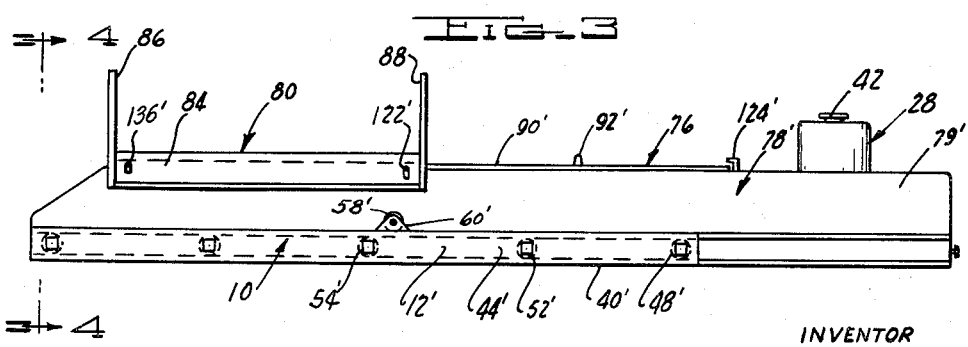

In the drawings:

Fig. 1 is a top plan veiw of a vehicle jack embodying the present invention, showing the carriage extended away from the base, Fig. 2 is a top plan view of the Fig. 1 jack with the carriage telescoped into the base, Fig. 3 is a side elevational view of the jack of Fig. 1, Fig. 4 is a sectional view taken along the line 4—4 of Fig. 3, Fig. 5 is a sectional view taken along the line 5—5 of Fig. 1, Fig. 6 is a view in perspective of the ramp shown in Fig. 1, Figure 7 is a view in perspective of the detachable saddle shown in Fig. 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As can best be seen in Fig. 1, the jack assembly comprises an elongated base 10 and a carriage 76 movable thereon.

The base 10 comprises two parallel trackways 12, 12' in spaced relation. The trackways are joined together at one end by a base plate 14. Base plate 14 extends between the trackways 12, 12' and is welded thereto. A vertical flange 16 extends from one end of the base plate 14 and is welded to the inner legs 18, 18' of the trackways 12, 12'. A threaded opening 20 is located centrally of the sides of flange 16 and near the base plate 14. A bolt 22 extends through the opening 20.

A second vertical flange 24 extends vertically from the opposite end of the base plate 14. The upper portion 26, as best seen in Fig. 5, of flange 24 extends inwardly towards the first flange 16. Flange 24 is substantially shorter than flange 16.

A lifting jack 28 is supported on base plate 14. The base plate 32 of lifting jack 28 extends beneath the inwardly turned portion 26 of flange 24 and the shank 34 of bolt 22, thus securing the lifting jack 28 to the base 10.

The lifting jack 28 may be removed from the base 10 by unscrewing the bolt 22 which acts to prevent vertical movement.

The lifting jack 28 is slidable transversely to trackways 12, 12'. This permits the jack 28 to be accurately centered beneath the axle of a truck.

The trackways 12, 12' are substantially of the same J-shaped construction. The outer vertical leg 44 is shorter than the inner leg 18.

A plurality of rollers 48, 48' are disposed in spaced relation at the bottom 40 of trackways 12, 12' transversely to the sides.

Rollers 48, 48' are rotatably mounted on the shanks of bolts 52, 52' which extend through openings 54, 54', 56, 56' in the sides of trackways 12, 12'.

Two additional rollers 58, 58' are mounted above the rollers 48, 48' at approximately one-third of the distance from the lifting jack 28 to the opposite end of the trackways 12, 12'. Rollers 58, 58' are rotatably mounted on projections 60, 60' extending from the outer side of legs 44, 44'.

The trackways 12, 12' are secured in spaced relation at the end opposite the lifting jack 28 by a second base plate 62 and vertical flanges 64, 66 projecting therefrom.

Flange 64 is provided with openings 67, 69 for operating rods 68, 70. Operating rod 68 is operatively connected to the pump in the lifting jack 28. The manually operable handle 72 is connected to operating rod 68 by means of conventional linkage 74. Linkage 74 translates the vertical travel of handle 72 into horizontal travel of the rod 68.

Operating rod 70 controls a valve in the lifting jack 28. The valve operates to hold the piston 42 when the truck is jacked up and to release piston 42 when it is desired to lower the truck.

The lifting jack 28 may be a standard hydraulic jack that has been modified so as to allow the operating rods 68, 70 to extend beneath the carriage 76 and consequently beneath the wheel of a truck. In a standard hydraulic jack the pump piston 71 and valve control mechanism 73 extend upwardly and outwardly from the base 32. According to the present invention, as shown in Fig. 5, these elements extend in a horizontal direction, substantially parallel to the base 32. This arrangement permits the operating rods 68, 70 to extend substantially horizontally and to be directly connected to the pump piston 71 and valve control mechanism 73 without the use of intervening linkage.

The carriage 76, as best seen in Fig. 4, comprises two parallel T-shaped rails 78, 78' disposed in spaced relation.

The rails 78, 78' are secured at one end by a wheel bottom support or saddle 80 mounted on the vertical projection 79, 79' of the T's.

The saddle 80 comprises a central portion 82 which conforms generally to the bottom of a tire, outwardly and downwardly turned flanges 83, 84 at each end of the central portion 82 and sides 86, 88 extending upwardly from the aforementioned flanges 83, 84 and central portion 82.

The rails 78, 78' are provided with flanges 90, 90' extending outwardly from the vertical projections 79, 79'. Pins 92, 92' extend vertically from the flanges 90, 90'. A second detachable saddle 96 is provided and is supported on the flanges 90, 90' and has openings 94, 94' which are engaged by the pins 92, 92'.

The second saddle 96 is provided for the occasion when it is desired to remove both wheels simultaneously on a dual wheel tractor or trailer. This would generally be done in a repair garage when it is desired to replace the brake lining or the like. The entire wheel assemblies may be removed on most trucks by unscrewing the nut provided at the end of the axle.

The saddle 96, as best seen in Fig. 7, is of smaller dimensions than the fixed saddle 80. It comprises a bottom portion 98 conforming generally to the shape of a tire and sides 100, 102 extending upwardly therefrom. One side is provided with a horizontally extending pin 104 located centrally thereof. For storage purposes, saddle 96 will nest inside saddle 80 with pin 104 engaging opening 106 provided in one side 86 of saddle 80.

A ramp 134 for a wheel, best seen in Fig. 6, is also provided. The ramp 134 comprises an inclined wheel surface 108 supported by triangular sides 110, 110' and crosspieces (not shown) extending between the sides 110, 110' and secured to the surface 108 at the underside thereof. Ramp 134 is provided with an extension 116 of surface 108. Extension 116 is inclined at the same angle with a horizontal plane as are downwardly turned flanges 83, 84. The extension 116 is provided with openings 118, 120 which can engage either pins 136, 122 or 136', 122' of flanges 83, 84 depending on which side of the jack the truck is going to be driven upon.

When the jack is stored, the ramp 134 may be mounted on the trackways 12, 12' between the lifting jack 28 and the saddle 80. For this purpose the trackways 12, 12' are each provided with a clamping projection 124, 124' to hold the foot of the ramp 134. The opposite end of the ramp 134 is securable to the saddle 80 by means of the ramp projection 116 being inserted into a cut-out 126 provided on the inner side 88 of the saddle 80. The carriage 76 may be locked to the base 10 in this position by means of pin 138 mounted on rail 78 which will engage the opening 128 provided in trackway 12. The pin 138 is secured in this inward position by rotating it until pin 130 registers with slots 127, 127' and is forced inward by spring 129.

In operation, the carriage 76 is detachably mounted on the base 10 by means of rollers 48, 48' and 58 and 58'. The "cross" or horizontal portions 132, 132' of the rails 78, 78' rest on the rollers 48, 48'. One half of the portions 132, 132' extend beneath the rollers 58, 58' thus preventing the carriage 76 from upward travel. Carriage 76 is thus movable along base 10 by means of rollers 48, 48', 58, 58'.

When a tire is to be removed, the carriage 76 is telescoped into the base 10 so that it is past the linkage 74, as may be best seen in Fig. 2. It may be locked in this position by means of the pin 138.

The lifting jack 28 is inserted beneath the truck and the saddle 80 is aligned with the flat tire. The ramp 134 is mounted on the saddle 80 adjacent the flat tire. The truck is then driven onto the saddle 80. The wheel lugs are then loosened and the lifting jack 28 is accurately aligned with the axle and actuated to raise the axle. The wheel lugs are then removed, the carriage 76 unlocked from the base 10 and the wheel is pulled free. The reverse procedure is used when a wheel is replaced. In the case where dual wheels are involved and it is wished to remove the inner wheel, the above procedure is repeated after the lifting jack 28 has been raised a little more to provide clearance for the saddle 80 beneath the inner wheel.

Besides the aforementioned advantages of ease of use, there are several additional advantages of this truck jack.

One of the weakest physical points in such a jack resides in the trackway and rail construction. By the use of line contact between the rollers and rails, the lowest stress per unit area is applied. The long length of the rollers further reduces the stress per unit area. This permits the rollers to carry very large loads. Also, the J-shaped construction of the trackways 12, 12' provides a structural member which will take most of its load in compression wherein the metal can take very high stresses. The same is true for the rails 78, 78' which have their vertical projections 79, 79' in compression and their horizontal sections 132, 132' taking loads basically as two relatively short levers instead of one longer lever.

These features of construction in combination with the use of heavy gage metal provide a rugged and durable truck jack.

The feature of operating the lifting jack from the side of the truck and the compact storage form provide a truck jack which is both safe to use and conveniently portable.

Having thus described my invention, I claim:

1. A vehicle jack comprising a lifting jack, a base member for supporting said lifting jack, said base member secured at the ends of a pair of generally J-shaped trackways, a plurality of rollers disposed on said trackways; a carriage supported by said rollers and movable thereon, said carriage comprising a pair of T-shaped rails in spaced relation, said rails being joined at one end by a first wheel bottom support; a second wheel bottom support adapted to be detachably mounted on a plurality of pins projecting from said rails adjacent said first support when said vehicle jack is being used and said second support adapted to be detachably secured within said first support when said vehicle jack is stored; a ramp for a wheel adapted to be detachably mounted at either end of said first wheel bottom support on a plurality of pins projecting therefrom when said vehicle jack is being used and said ramp adapted to be detachably secured on said base between clamps on said base and clamps on said first support when said vehicle jack is being stored.

2. The vehicle jack as described in claim 1 and further characterized in that said ramp for a wheel comprises an inclined wheel surface supported by a triangular section at each side and a plurality of cross members extending between said triangular sections; said inclined surface extending beyond said triangular section; said extension having openings adapted to receive the pins projecting from the said first wheel bottom support.

3. The vehicle jack as described in claim 1 and further characterized in that said first wheel bottom support comprises a central surface conforming generally to the contour of a tire, an outwardly and downwardly directed flange extending from one end of said central surface and having pins projecting therefrom adapted to engage said wheel ramp and an outwardly and downwardly directed flange extending from the other end of said central surface and having pins projecting therefrom adapted to engage said wheel ramp; said central surface and downwardly directed flanges having upwardly directed sides; one of said sides having a cut-out near the top adapted to engage the said extension of the inclined surface of said wheel ramp when said vehicle jack is being stored, the other side of said first wheel support having an opening; said second wheel support having a bottom surface conforming generally to the contour of a tire and upwardly directed sides extending from said surface; one of said sides having a pin projecting therefrom adapted to engage the opening in said first wheel support when said vehicle jack is being stored.

4. A vehicle jack comprising an elongated base, said base comprising a pair of generally J-shaped trackways secured in spaced relation by a first base member at one end and a second base member near the other end; said first base member comprising a horizontally disposed bottom plate having a first vertically disposed flange at one end adjacent to the ends of said trackways and a second vertically disposed flange at the other end; said first flange being provided with a threaded opening near said bottom plate and a bolt projecting through said opening towards said second flange; said second flange being substantially shorter than said first flange and having the upper portion turned toward said first flange; and a lifting jack detachably mounted on said first base member; said lifting jack having its base plate projecting beneath said bolt of the first flange and said turned portion of the second flange; said second base member comprising a horizontally disposed bottom plate having a first vertically disposed flange adjacent the ends of said trackways, and a second vertically disposed flange at the other end of said base plate; said first flange having perforations; means passing through said perforations and operatively connected to said lifting jack for operating said jack; a plurality of first rollers disposed in spaced relation at the bottom and transverse to the sides of said J-shaped trackways; a second roller mounted on each of said trackways above said first rollers adjacent the outer sides of said trackways; a carriage supported in the downward direction by said first rollers and in the upward direction by said second rollers; said carriage comprising a pair of T-shaped rails disposed with the center projection pointing upwardly; said rails secured in spaced relation by a first wheel bottom support mounted on the rails at one end thereof; a second wheel bottom support adapted to be detachably mounted on a plurality of pins projecting from said rails adjacent said first support when said vehicle jack is being used and adapted to be detachably secured within said first support when said vehicle jack is stored; a ramp for a wheel adapted to be detachably mounted at either end of said first support on a plurality of pins projecting from each end of said first support when said vehicle jack is being used and adapted to be detachably secured on said vehicle jack between clamps on said trackways and clamps on said first support when said vehicle jack is being stored.

5. A vehicle jack comprising an elongated base, said base comprising a pair of generally J-shaped trackways secured in spaced relation by a first base member adjacent one end and a second base member adjacent the other end; said first base member having means to slidably mount a lifting jack, a lifting jack detachably mounted on said first base member, means on said elongated base remote from said jack and operatively connected thereto for operating said jack; a plurality of first rollers disposed in spaced relation at the bottom and transverse to the sides of said J-shaped trackways, a second roller mounted on each of said trackways above said first rollers adjacent the outer sides of said trackways, a carriage supported by said first rollers and movable between said first and second rollers; said carriage comprising a pair of T-shaped rails having their horizontal sections bearing on said first rollers and extending beneath said second rollers and their vertical sections supporting a first wheel saddle fixedly fastened at one end and a second wheel saddle detachably mounted adjacent said first saddle; said first saddle having means at each end for detachably mounting a ramp for a wheel and a ramp for a wheel adapted to be detachably mounted at either end of said first saddle.

6. A vehicle jack comprising an elongated base, said base comprising a pair of generally J-shaped trackways secured in spaced relation by a first base member adjacent one end and a second base member adjacent the other end; said first base member having means to slidably mount a lifting jack, a hydraulic lifting jack slidably mounted on said first base member, said lifting jack having means adjacent the bottom thereof extending horizontally adapted to receive two operating rods, two operating rods operatively connected to said jack and extending parallel to the plane of said base members; a plurality of first rollers disposed in spaced relation at the bottom and transverse to the sides of said J-shaped trackways, a second roller mounted on each of said trackways above said first rollers adjacent the outer sides of said trackways, a carriage supported by said first rollers and movable between said first and second rollers; said carriage comprising a pair of T-shaped rails having their horizontal sections bearing on said first rollers and extending beneath said second rollers and their vertical sections supporting a first wheel saddle fixedly fastened at one end and a second wheel saddle detachably mounted adjacent said first saddle; said first saddle having means at each end for detachably mounting a ramp for a wheel and a ramp for a wheel adapted to be detachably mounted at either end of said first saddle.

7. A vehicle jack comprising an elongated base including a pair of substantially parallel trackways secured in spaced relation; said trackways being generally channel shaped members having the channel facing upwards; a plurality of first rollers disposed within the channel of each trackway; at least one second roller mounted on each of said trackways above the first rollers; a carriage supported by said first and second rollers; said carriage comprising a pair of substantially parallel rails secured in spaced relation and movable between said first and second rollers; a first wheel saddle fixedly fastened at one end of the carriage; a second wheel saddle adapted to be detachably mounted adjacent the first saddle; the first saddle having means on at least one end for detachably mounting a ramp for a wheel; a ramp for a wheel adapted to be detachably mounted on an end of the first saddle; a lifting jack mounted at one end of the base; said lifting jack having pump means and valve control means adjacent the lower end thereof extending outwardly and substantially parallel to the base; each of said pump and valve control means adapted to be directly connected to an operating rod; and a pair of operating rods connected thereto and extending beneath the carriage to a point adjacent the end of the base opposite from the lifting jack.

References Cited in the file of this patent

UNITED STATES PATENTS

| | | |
|---|---|---|
| 2,263,506 | Lane | Nov. 18, 1941 |
| 2,600,742 | Drum | June 17, 1952 |
| 2,782,076 | Miller | Feb. 19, 1957 |